(No Model.)
J. A. KURTZ.
PIPE THREAD PROTECTOR.
No. 440,167. Patented Nov. 11, 1890.
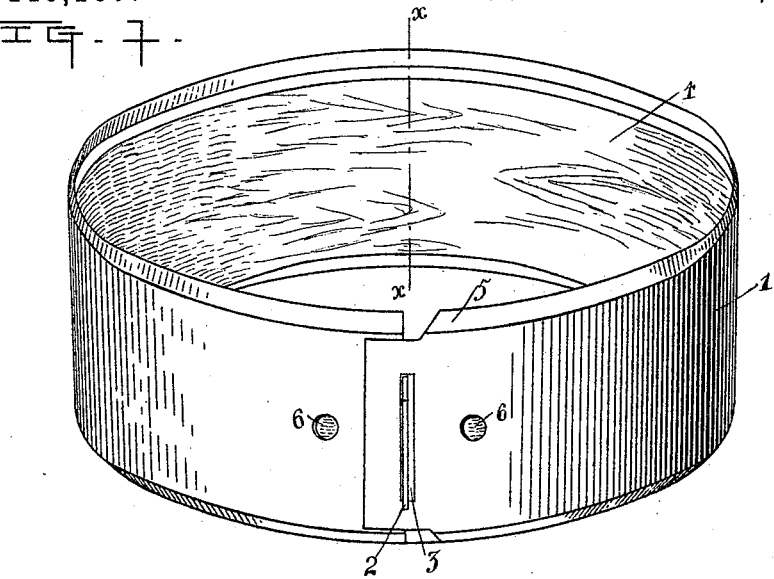
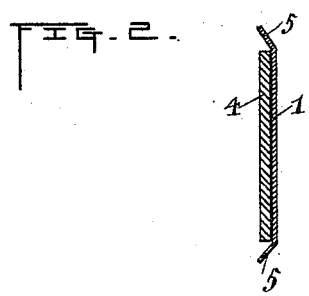
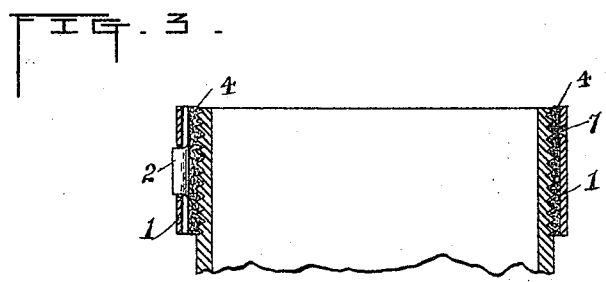
Witnesses
Archie M. Catlin
E. R. Conner
Inventor
John A. Kurtz
By his Attorney
Benj. R. Catlin

United States Patent Office.

JOHN A. KURTZ, OF ALLEGHENY, PENNSYLVANIA, ASSIGNOR OF TWO-THIRDS TO E. T. COOPER AND WILLIAM TRAUT, BOTH OF SAME PLACE.

PIPE-THREAD PROTECTOR.

SPECIFICATION forming part of Letters Patent No. 440,167, dated November 11, 1890.

Application filed April 25, 1890. Serial No. 349,534. (No model.)

*To all whom it may concern:*

Be it known that I, JOHN A. KURTZ, a citizen of the United States, residing at Allegheny city, in the county of Allegheny and State of Pennsylvania, have invented certain new and useful Improvements in Pipe-Thread Protectors; and I do hereby declare the following to be a full, clear, and exact description of the invention, such as will enable others skilled in the art to which it appertains to make and use the same.

The screw-threads of iron and other pipes are liable to injury during transportation and at other times from the impact of one upon another or from blows which they receive from being handled or moved in various ways; and the object of the invention is to provide means for protecting the screw-threads of pipes and for analogous purposes; and it consists in the construction hereinafter described and particularly pointed out.

In the accompanying drawings, Figure 1 is a perspective. Fig. 2 is a section on line $xx$ of Fig. 1; and Fig. 3 is a similar section of a modification, showing the application of the device to a pipe.

Numeral 1 indicates a band made of elastic material, preferably metal. It is at one end provided with a catch or lip 2 and at the other with a slot 3, by which the two ends can be engaged with each other and secured about the screw-threaded or other portion of a pipe to protect the same.

4 indicates a supplemental band or lining made of material such as wood, paper, woven fabric, rubber, or any like substance. As shown in Fig. 1, this lining is held in place by flange 5, formed on the exterior or main band, the elasticity of the supplemental band holding it in the channel between the flanges.

6 6 indicate holes in the exterior band for the application of forceps or other tool, whereby the band may be expanded and applied to the screw-threaded portion of pipe and then fastened thereon by engaging the lip 2 in one of the slots. Several slots may be provided to adapt the band to different-sized pipes. The lining can be cut to shorten it, if necessary, to adapt it for small sizes of pipe. Preferably the ends of the lining abut, or nearly so.

Instead of the flanges other means of securing or holding the interior band or lining may be employed. Thus the main band may be punched to produce a burr or burrs 7, which engage the lining, as shown in Fig. 1.

In some cases it is proposed to screw the protector upon the screw-threaded end of pipes. For this purpose, if desired, holes may be provided in the interior band to adapt it to be engaged by a tool whereby it can be screwed upon a pipe, and in such case the ends of the outer band may be engaged either before or during the application of the device. Thus, the main band being expanded, the lining will yield, if necessary, to permit its receiving the screw-threaded end of the pipe, and after the latter is entered the ends of the main band can be fastened together and the device screwed home. The particular method of application, however, can be varied to suit different circumstances, as in some cases it is proposed to wrap or otherwise apply the inner band or lining and then place about and secure upon it the expanded ring.

Several features of the above-described device can be varied by mechanical skill without departing from the invention. Thus several fastening-lips, slots, and tool-openings may be provided, and also other equivalent means for securing the main band and lining together. Projections on the exterior of the main band could also be used instead of the holes to facilitate the application of pliers or other tool, and these and similar mechanical changes are contemplated by the invention.

The most frequent cause of injury to screws and screw-threaded pipes is the friction they are subjected to when piled in cars and transported. In such case they are subjected to endwise motion upon each other, by which the threads are repeatedly brought in contact and abraded. Ordinary fibrous coverings alone are insufficient to resist this abrading action. I therefore provide a metallic protector, and I provide it with a wooden or other lining, because its weight can thereby be made less, and because such material can be more conomically fitted to or secured upon the screw-threads.

It will of course be understood that the protector is applicable to solid screws and to those of any length. The protector can be removed without the use of any special tool. By a chisel or bar its lip or lips can be easily released, whereupon the band expands, which feature will be found convenient in situations where suitable pipe-wrenches are not usually kept on hand.

Having thus described my invention, what I desire to secure by Letters Patent is—

1. The divided ring or band provided with a fastening-lip on one end and a slot in the other, and having a lining of wood or other equivalent material, substantially as set forth.

2. The divided ring or band provided with a fastening-lip on one end and a slot in the other and with holes to receive a tool, and having a lining of wood or equivalent material, substantially as set forth.

3. The divided ring or band provided with a fastening-lip and slot with a lining, said band having flanges or equivalent for holding the lining in place, substantially as set forth.

4. A divided elastic band provided with fastening devices, in combination with a divided elastic band-like lining, substantially as set forth.

5. A divided elastic band provided with fastening devices, in combination with a divided elastic band-like lining and flanges or equivalent for holding the lining in place, substantially as set forth.

In testimony whereof I affix my signature in presence of two witnesses.

JOHN A. KURTZ.

Witnesses:
ARCHIE M. CATLIN,
BENJ. R. CATLIN.